Figure 1:
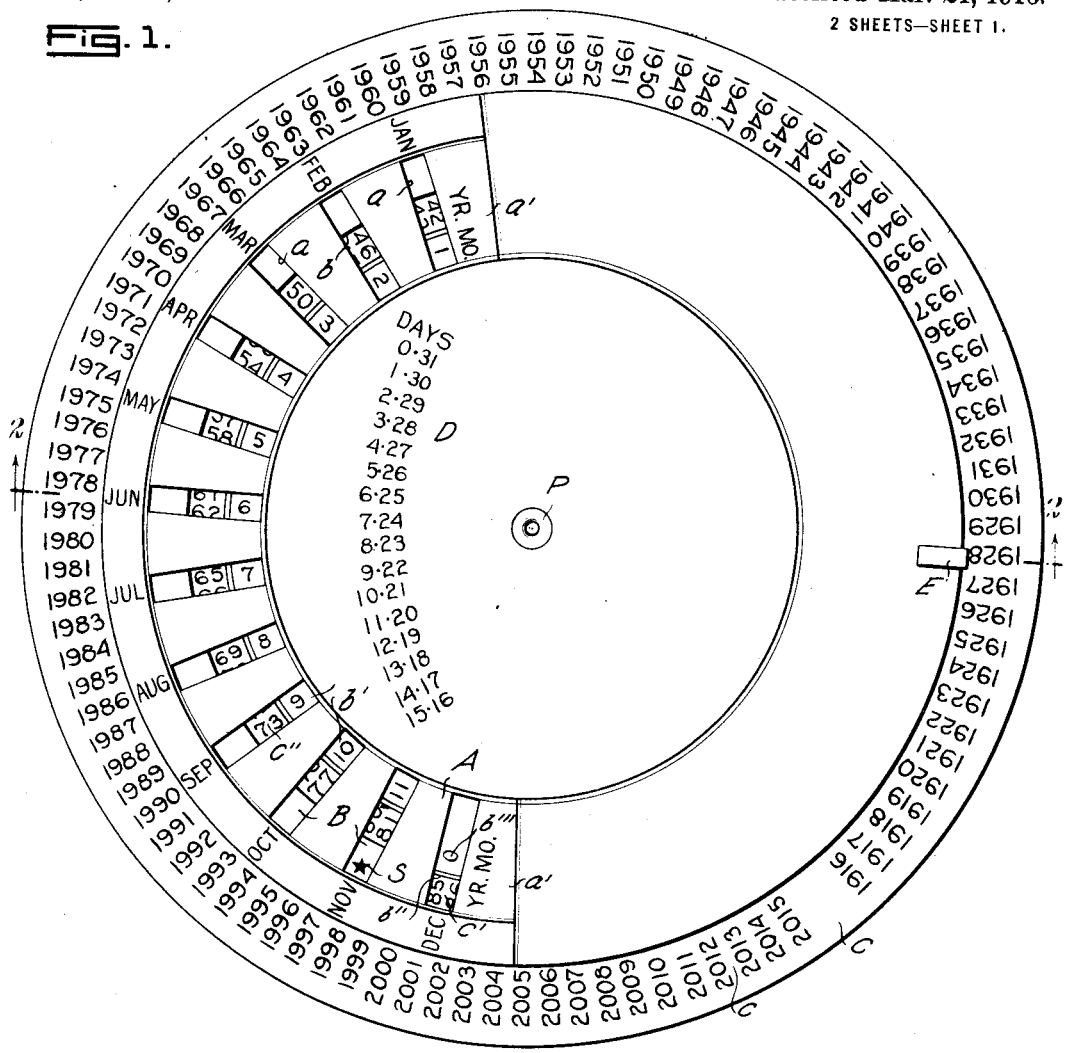

G. H. HEWITT, Jr.
BOND MATURITY CALCULATOR.
APPLICATION FILED DEC. 1, 1915.

1,176,556.

Patented Mar. 21, 1916.
2 SHEETS—SHEET 1.

WITNESSES

INVENTOR
G. H. Hewitt, Jr.
BY
ATTORNEYS

G. H. HEWITT, Jr.
BOND MATURITY CALCULATOR.
APPLICATION FILED DEC. 1, 1915.

1,176,556.

Patented Mar. 21, 1916.
2 SHEETS—SHEET 2.

WITNESSES

INVENTOR
G. H. Hewitt, Jr.
BY
ATTORNEYS

UNITED STATES PATENT OFFICE.

GEORGE H. HEWITT, JR., OF ENGLEWOOD, NEW JERSEY, ASSIGNOR TO HERRICK & BENNETT, OF NEW YORK, N. Y., A FIRM.

BOND-MATURITY CALCULATOR.

1,176,556.   Specification of Letters Patent.   Patented Mar. 21, 1916.

Application filed December 1, 1915. Serial No. 64,468.

*To all whom it may concern:*

Be it known that I, GEORGE H. HEWITT, Jr., a citizen of the United States, and a resident of Englewood, in the county of Bergen and State of New Jersey, have invented a new and Improved Bond-Maturity Calculator, of which the following is a full, clear, and exact description.

This invention relates to means for determining the terms which bonds, promissory notes or the like, have to run from the present date to the date of maturity, the primary object of the invention being to provide a simple device having relatively movable parts with data arranged thereon and adapted to indicate, by a simple adjustment of the relatively movable parts, the number of years, months and days to the date of maturity.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 2:
Figure 3:
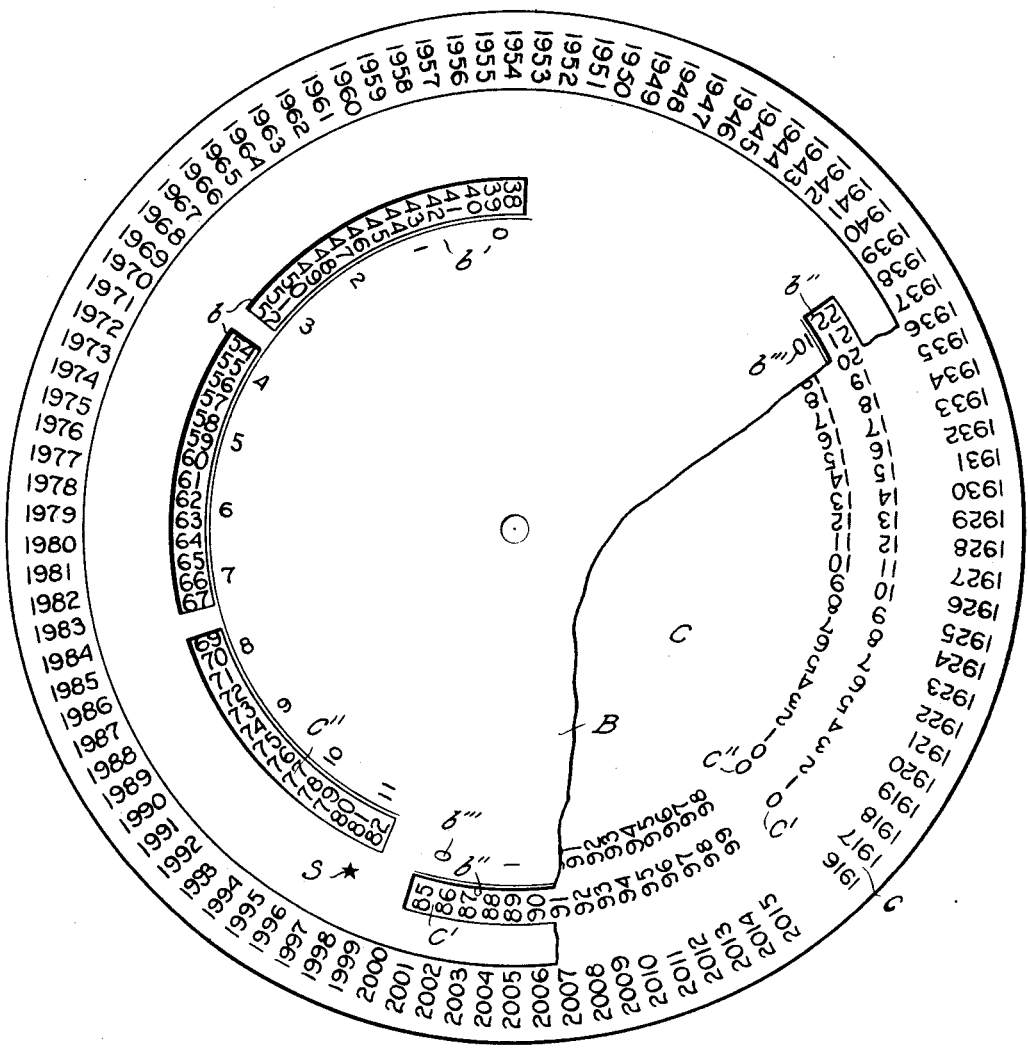

Figure 1 is a plan view of a practical embodiment of the invention constructed to calculate periods of time from the year 1916 as the present year, and adjusted to indicate November as the present month; Fig. 2 is a central sectional view on the line 2—2 of Fig. 1; and Fig. 3 is a plan view of the lowest two elements of the device, but with a portion of the middle element broken away.

Referring now more particularly to the drawings, I show my device as comprising three principal disk-like relatively movable elements A, B and C pivoted permanently together at P at their centers. The first two disks A and B are shown as of the same size, while the diameter of the third or lowermost disk is greater than that of the first two.

The first disk A is provided with a series of slots $a$ arranged radially with respect to the pivot P and the series being formed circumferentially with respect to the same point. These slots terminate at their outer ends far enough within the periphery of the disk A to provide a space for the names of the twelve months of the year directly opposite the same in proper order from January to December. At either end of the series of slots is placed at $a'$ the legend Yr. Mo. for coöperation with certain series of numerals carried by the disks below.

The second disk B is provided on one side of its center with an arc-shaped series of slots $b$ arranged concentrically with the pivot P and closely adjacent the inner edges of these slots is arranged a series of numerical characters from 0 to 11 indicated at $b'$, arranged in regular order and spaced corresponding to the circumferential spacing between the adjacent names of the months above described. On the opposite side of the last slot $b$ and in radial alinement with the numeral 11 of the series $b'$ is placed an indicator mark shown as a star S. The slots $a$ above described are of such a length and are so placed as to overlap the slots $b$ and disclose both the star and the numerals of the series $b'$. The disk B is provided on its opposite side with a second series of circumferential slots $b''$ which, like the others, are concentric with the apparatus but at a greater radial distance from the center than the first mentioned slots $b$, the radial distance being substantially the same as that of the star. Closely adjacent the inner edge of the slots $b''$ is a series of numerals from 0 to 10 indicated at $b'''$. The radial distance of this series $b'''$ is substantially equal to the radial distance of the slots $b$, and hence the slots $a$ are adapted to register with the slots $b''$ and disclose the numerals of either series $b$ or $b'''$.

The third disk C is provided with three concentric series of numerals $c$, $c'$ and $c''$. The first series of numerals $c$ represents all of the year dates in regular order from the present year or the year in which the calculations are made, shown as 1916, for a period of time as large as may be required, indicated in this instance as for all terms within one hundred years. This series of year dates is printed or otherwise placed upon the margin of the disk and is always visible beyond the first two disks. The second series of numerals $c'$ consists of a consecutive arrangement of numerals from 0 to 99 arranged between the first series of numerals and the pivot and in radial alinement with the year numbers in regular order, the 0 being in alinement with the year of calculation, and each of the remaining numerals of the series c' being radially opposite the corresponding year date, terminating with the numeral 99 opposite the last year date 2015, as indicated on Fig. 3. This series c', furthermore, is spaced inwardly toward the center from the first series c corresponding with the slots b'' of the second disk. The third series of numerals c'' is arranged just between the series c' and the center, and like the series c' is intended to indicate year periods. The characters of this last series are the same in number as the second series, and begin with 0 0 and continuing then in regular order from 1 to 98 inclusive, each character of this last series after the first 0 being one less in value than that character of the second series in radial alinement therewith. The series c'' is so located radially as to be visible through the slots b.

At any convenient place is printed or otherwise arranged a table D of day periods shown herein as being applied to the face of the first disk. This table comprises a column of numerals from 0 to 15 in regular order opposite each of which is the complement of 31 thereof, the second column, therefore, comprising the numerals 31 to 16 inclusive in descending regular order.

The method of use of this calculator may be briefly set forth as follows: The disks A and B are rotated relatively so as to bring the indicator S into view through the slot opposite the present month, meaning thereby the month from which the calculation is made. These two disks will then be clamped together for unitary manipulation throughout such month, as by means of a clip E. But one adjustment, therefore, is required for all of the calculations during the present month. It will be noted in this connection that the numeral 11 of the series b' will always be in radial alinement with the name of the present month. Assuming for the sake of illustration that the term of a bond due and payable on March 1, 1967, is to be calculated from the present date as November 10, 1916, following the usual course of computation, the term would be found by writing the year, month and day of maturity in a line as 1967—3—1, and then writing beneath this line another line indicating the present time as 1916—11—10, and subtracting, beginning with the days. Since 10 cannot be taken from 1, a month or 30 days is borrowed from the months, and then subtracting ten leaves a remainder of 21, or the number of days. Then subtracting the months in the same manner, borrowing a year from the year column, the number of months is determined as 3, and finally subtracting the present year from the remaining number of years, the number 50 is found for the years. This usual manner of calculation of a term is referred to herein at length for the purpose of showing the importance of arranging the numerals of the series b' so that the numeral 11 will always register with the name of the present month. In other words, it may be stated that from any date to the corresponding date of a succeeding year is exactly eleven months and thirty days. Referring now again to the use of this apparatus, all that is required for the operator to do after the disks A and B are adjusted for the month of calculation, which, in the example given, is November, is for him to rotate the disks A and B clampd together so as to bring the month, "March", of the maturity date in radial alinement with the year of maturity, 1967. The year term, 50, and the number of months, 3, will then appear directly without calculation through the slot a in radial alinement with the number of the year and name of the month of maturity. By referring now to the table D and finding on such table the number corresponding to the present day, 10, the complementary number, 21, is the number of days required in the result. The apparatus is designed for the purpose of thus indicating the term of any bond maturing on the first day of any subsequent month, most bonds being payable on the first of the month. If, however, the maturity date should be any other day of the month, it is a simple matter to adjust the answer accordingly without calculation.

I claim:—

1. The herein described maturity calculator comprising three relatively movable parts, one of such parts bearing the names of the twelve months in regular order and having a series of twelve slots arranged opposite the respective month names, the second part having a series of characters to indicate terms of months spaced from one another according to the spaces between the slots of the first part, said second part also having slots formed therethrough adjacent the characters carried thereon, and the third part bearing three series of numerals, one series comprising year dates and the other two series referring to terms of years visible through the slots of the first mentioned parts, substantially as set forth.

2. In a maturity calculator, the combination of three disks permanently connected concentrically to one another for relative rotation, two of the disks being adapted for conjoint movement, the third disk being of a greater diameter than the two just mentioned and having on its projecting periphery a series of consecutive year dates beginning with the year of calculation, said largest disk also bearing two series of characters indicating year terms disposed inwardly from the year dates in radial alinement therewith, the inner series of year terms being one less in value than the corresponding characters in alinement therewith, the first two disks being provided with series of registering and transversely arranged slots through which the characters of the year term series are visible, and said first two disks also being provided with characters to indicate terms of months directly without computation upon adjustment of the two with respect to the last mentioned disk, substantially as set forth.

3. In a bond maturity calculator, the combination of three concentrically connected relatively rotary disks, one disk being provided with three series of numerical characters, one series referring to year dates and the other two series referring to terms of years, the several characters of each series being arranged in radial alinement with the respective characters of the other series, the yearly terms in one series beginning with 0 being arranged opposite the yearly dates beginning with the year of calculation, and the characters of the other series of other terms of years being respectively one less in value than the first mentioned series of terms of years; the next adjacent disk being provided with two series of concentrically arranged slots corresponding in radial distance to the two series of terms of years and also being provided with numerical characters adjacent said slots pertaining to terms of months; the third disk being provided with a series of radially arranged slots intersecting the circumferential slots aforesaid and also having arranged thereon opposite the respective slots the names of the twelve calendar months in regular order; and an indicator carried by the second disk to facilitate the adjustment thereof with respect to the last described disk to position the month of calculation, substantially as set forth.

4. The herein described maturity calculator of the character set forth comprising three relatively movable parts, means to limit such movement along definite lines, means to secure two of said parts together for unitary movement for all calculations during a certain period of calculation, the first of said two parts being provided with a series of slots and having arranged adjacent said slots the names of the twelve months in regular order, the other of the two parts being provided with slots arranged beneath the slots of the first mentioned part and extending transversely thereof, said second part also bearing a series of characters to indicate periods of months and visible through the slots of the first part, and the third part being provided with a series of consecutive year dates beginning with the year of the calculation, such series being always visible, and also being provided with a series of consecutive numerical characters representing terms of years visible through the intersecting slots of the first two parts, substantially as set forth.

GEO. H. HEWITT, Jr.

Witnesses:
  Geo. D. Reeler,
  Philip D. Rollhaus.